(12) United States Patent
Bellanger

(10) Patent No.: US 8,743,982 B2
(45) Date of Patent: Jun. 3, 2014

(54) SYSTEMS FOR THE MULTICARRIER TRANSMISSION OF DIGITAL DATA AND TRANSMISSION METHODS USING SUCH SYSTEMS

(75) Inventor: Maurice Bellanger, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 143 days.

(21) Appl. No.: 13/498,592

(22) PCT Filed: Sep. 28, 2010

(86) PCT No.: PCT/FR2010/000644
§ 371 (c)(1),
(2), (4) Date: Mar. 28, 2012

(87) PCT Pub. No.: WO2011/039431
PCT Pub. Date: Apr. 7, 2011

(65) Prior Publication Data
US 2012/0189036 A1    Jul. 26, 2012

(30) Foreign Application Priority Data

Oct. 2, 2009    (FR) ...................................... 09 04712

(51) Int. Cl.
*H04K 1/10*    (2006.01)
(52) U.S. Cl.
USPC ............ 375/260; 375/146; 375/130; 375/295
(58) Field of Classification Search
USPC .................. 375/260, 146, 130, 295; 270/206
See application file for complete search history.

(56) References Cited

U.S. PATENT DOCUMENTS

| | | | | |
|---|---|---|---|---|
| 2005/0271152 | A1* | 12/2005 | Kim et al. | 375/260 |
| 2006/0148408 | A1* | 7/2006 | Cho et al. | 455/67.7 |
| 2009/0316569 | A1* | 12/2009 | Lele et al. | 370/206 |

OTHER PUBLICATIONS

International Search Report dated Feb. 10, 2011, corresponding to PCT/FR2010/000644.
Ehsan Azarnasab, et al.; Department of Electrical and Computer Engineering; "Filterbank Multicarrier and Multicarrier CDMA for Cognitive Radio System"; Apr. 15, 2007; pp. 1-28.

* cited by examiner

*Primary Examiner* — Zewdu Kassa
(74) *Attorney, Agent, or Firm* — Young & Thomspson

(57) ABSTRACT

A system includes at least a transmitter having a serial-to-parallel converter, an iFFT block and a frequency de-spreader device that applies each signal that results from multiplying a data sample by one of the predetermined frequency coefficients of the prototype filter of a synthesis filter bank to one of the inputs of the iFFT block presenting a size that is strictly greater than the number of subchannels. Also described is a system including at least one receiver including a serial-to-parallel converter, a FFT block presenting a size that is strictly greater than the number of subchannels of the system, and a frequency de-spreader device that multiplies the signal from each output of the FFT block by one of predetermined frequency coefficients of the prototype filter of an analysis filter bank and sums the results of these multiplications to deliver at least a portion of the output signal from the receiver.

15 Claims, 3 Drawing Sheets

SYSTEMS FOR THE MULTICARRIER TRANSMISSION OF DIGITAL DATA AND TRANSMISSION METHODS USING SUCH SYSTEMS

TECHNICAL FIELD TO WHICH THE INVENTION RELATES

The invention relates to a system for transmitting digital data over a communications channel by using multicarrier modulation based on filter banks, and more particularly it relates to an improved technique for implementing such a system.

TECHNOLOGICAL BACKGROUND

Systems for transmitting digital data make use of multicarrier modulation schemes in order to achieve high levels of effectiveness, robustness, and flexibility in operation.

One approach that is effective for implementing the principle of multicarrier modulation is based on filter banks and it is known as the filter bank based multicarrier (FBMC) approach.

The channel for transmitting digital data is subdivided into subchannels, and in each subchannel, the data modulates a subcarrier.

A conventional implementation of filter banks consists in combining a block that is suitable for outputting the discrete Fourier transform of said signal as applied to its input, referred to as an FFT block, and of a size, i.e. having a number of outputs, that is equal to the total number of subchannels in the modulation system, with a polyphase network (PPN) that is a set of digital filters, the number of filters being equal to the size of the discrete Fourier transform known as the fast Fourier transform (FFT) by reference to the fast algorithms used for implementing it.

This technique, principle, calculation, and implementation is described in the work by M. Bellanger, "Digital processing of signals", Wiley, 2000, at pages 304 to 306 and 309 to 333.

Its application to digital transmission is described in the article by P. Siohan et al., "Analysis and design of OFDM/OQAM systems based on filter bank theory", IEEE Transactions on Signal Processing, Vol. 50, No. 5, 2002.

The technique in most widespread use for multicarrier modulation is the orthogonal frequency division multiplexing (OFDM) technique, which is likewise based on the FFT. This technique is described in the work by M. Bellanger, "Digital processing of signals", published by Wiley in 2000, at pages 414 to 418.

In this technique, the FFT is performed at the symbol rate of the multicarrier modulation, where a symbol is constituted by a set of output signals delivered simultaneously by an iFFT block, that is adapted to deliver at its output a signal that corresponds to the inverse Fourier transform of the signal applied to its input.

At the receiver, the sets of signals transmitted by the iFFT block of the transmitter are thus processed by the FFT block in disjoint manner. In the presence of a transmission channel, a guard time is introduced between the symbols on transmission in order to avoid interference between two symbols, and a single-coefficient equalizer compensates the distortions of the channel at multicarrier level, on reception.

The principle of OFDM is simple and well understood, since the FFT forms part of the basic knowledge of engineers in the field of communications. Furthermore, the transmission chain introduces a minimum amount of delay, and this is a characteristic that is well appreciated in numerous applications.

However, the guard time reduces the rate at which data is transmitted, and the filtering properties of the FFT are not sufficient to take full advantage of new concepts in radio communications, in particular cognitive radio.

In contrast, the FBMC technique, which does not require a guard time and which provides high spectral resolution and subchannel independence, lends itself well to cognitive radio.

On reception of the signals carrying the data, the distortion of the transmission channel is compensated by an equalizer in the time domain for each of the subchannels, as explained by T. Ihalainen et al. in the article "Channel equalization in filter bank based multicarrier modulation for wireless communications", Eurasip Journal on Advances in Signal Processing, Vol. 2007, ID 49389.

When searching for high-performance equalization, the equalizer in each subchannel possesses a plurality of coefficients and associated memories, and it introduces an additional delay in transmission, and that can be a drawback in certain applications.

The FMBC technique is thus more complex to understand and to implement than OFDM, and it gives rise to additional delay in equalization.

OBJECT OF THE INVENTION

An object of the present invention is to provide a high-performance transmission system that is effective and easy to implement, by using the principle of multicarrier modulation by filter banks.

This object, and others, are achieved by the transmission system of the invention, which is a multicarrier transmission system for transmitting a signal comprising digital data over a predetermined number of subchannels, the system comprising at least a transmitter having a synthesis filter bank deduced from a prototype filter by frequency translation, the transmitter including a serial-to-parallel converter that forms sets of samples of said signal for transmission, each set comprising a number of samples equal to the number of subchannels of said system, and an iFFT block adapted to output the inverse Fourier transform of said signal applied to its inputs, wherein said transmitter also includes a frequency spreader device that multiplies each data sample of each set of data samples from the serial-to-parallel converter by predetermined frequency coefficients of the prototype filter of the synthesis filter bank, and applies each signal resulting from the multiplication of a data sample by one of said frequency coefficients to one of the inputs of the iFFT block, which block presents a size, i.e. a number of inputs equal to its number of outputs, that is strictly greater than said predetermined number of subchannels.

Such a transmitter presents the advantage of using only a small number of coefficients and only one iFFT block for signal processing. In remarkable manner, this iFFT block presents a size, i.e. a number of inputs and outputs, that is strictly greater than the number of subchannels, unlike the iFFT blocks that have been used conventionally. The signals transmitted from the outputs of the iFFT block then present partial time overlap.

According to other advantageous and non-limiting characteristics of the transmission system of the invention:

the transmitter also includes an overlap/sum device comprising a parallel-to-serial converter that receives as inputs the signals from the outputs of the iFFT block and that delivers as output an output signal corresponding to the time succession of successive output signals from the iFFT block, the overlap/sum device also adding a portion of the output signal from the serial-to-parallel converter to a portion of one or more preceding output signals from the iFFT block, in order to deliver the signal that is transmitted by said transmitter;

said size of the iFFT block of the transmitter is equal to the length of the prototype filter of the synthesis filter bank, said length being a multiple by an integer factor K of the total number of subchannels M; and a number of signals transmitted by the same number of adjacent outputs of the iFFT block present time overlap corresponding to M data samples, where said number is equal to said factor K, and said overlap/sum device sums the overlapping portions of each of these K signals transmitted by K adjacent outputs of the iFFT block to deliver at least a portion of the signal transmitted by said transmitter.

The invention also provides a multicarrier transmission system for transmitting digital data over a predetermined number of subchannels, the system including at least one receiver having an analysis filter bank deduced from a prototype filter by frequency translation, the receiver having a serial-to-parallel converter that forms sets of samples of the received signal, each set comprising a number of samples equal to said predetermined number of subchannels of the system, and an FFT block adapted to deliver at its output the Fourier transform of the signal applied to its input, wherein said FFT block of said receiver presents a size, i.e. a number of inputs equal to the number of its outputs, that is strictly greater than said predetermined number of subchannels of the system, and wherein said receiver further includes a frequency de-spreader device that multiplies the signal from each output of the FFT block by one of the predetermined frequency coefficients of the prototype filter of the analysis filter bank, and sums the results of these multiplications in order to deliver at least a portion of the output signal from said receiver.

The distortion of the transmission channel is compensated by an equalizer that is introduced between each FFT block and the frequency de-spreader device, such that no additional delay is needed. In remarkable manner, because of the time overlap of the data samples applied as input to the FFT block, the equalizer can operate without delay and without additional processing of the output signal from the FFT block. The processing of the signals is thus simpler and faster.

This time overlap corresponds to repeating a predetermined amount of digital data in a plurality of sets of successive data samples input to the FFT block.

According to other advantageous and non-limiting characteristics of the transmission system of the invention:

said receiver also includes a synchronizer device imposing a calculation rate on the FFT block that is strictly greater than the rate equal to the reciprocal of the size of said FFT block;

the size of the FFT block of the receiver is equal to the length of the prototype filter of the filter bank, said length being a multiple by an integer factor K of the total number of subchannels M, and wherein two consecutive input signals of the FFT block present time overlap by a number of received signal samples equal to the size of the FFT block from which the total number of the subchannels M has been subtracted; and the receiver includes an equalizer inserted between the FFT block and the frequency de-spreader device, which equalizer multiplies the signal from each output of the FFT block by a predetermined equalizer coefficient.

The invention also provides a multicarrier transmission method for transmitting a signal using the multicarrier transmission system as described above, wherein the signals of the subchannels are modulated using OQAM.

The invention also provides a multicarrier transmission system for transmitting digital data, the system being based on filter banks, and comprising a transmitter and a receiver as described above.

Finally, the invention provides a multicarrier method of transmitting digital data using the multicarrier transmission system comprising a transmitter and a receiver as described above, wherein the signals of the subchannels are modulated by OQAM.

DETAILED DESCRIPTION OF AN EMBODIMENT

The following description made with reference to the accompanying drawings, given by way of non-limiting example, serves to make it understood how the invention can be implemented.

In the accompanying drawings:

FIG. 1 shows the transmitter 10 of a transmission system of the invention.

Figure 1:
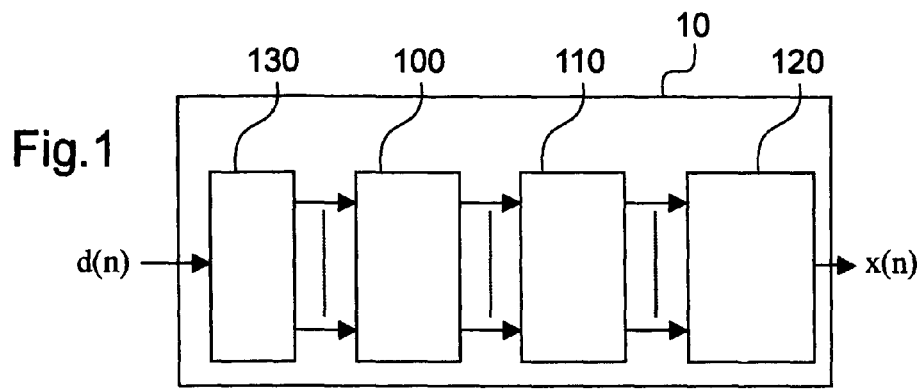
FIG. 1 is a block diagram of the transmitter of a multicarrier transmission system based on filter banks and in accordance with the invention.

The transmitter 10 comprises a serial-to-parallel converter 130, a frequency spreader device 100, an iFFT block 110 adapted to output the inverse Fourier transform of the signal applied to its inputs, and an overlap/sum device 120 comprising a parallel-to-serial converter 121 and a set of memories 122, 123 & 124 and of adders 125, 126 & 127.

The frequency spreader device 100, the iFFT block 110, and the overlap/sum device 120 form a synthesis filter bank.

This synthesis filter bank is derived from a lowpass prototype filter by frequency translation.

The input digital data d(n) is applied as input to the serial-to-parallel converter 130 coupled to the frequency spreader device 100. The index n corresponds to a time count. It is given to the input and output signals of the transmitter 10 and of the receiver 20 (FIG. 5) of the transmission system and it indicates that the signal under consideration has data received or transmitted at a rate taken as unity, corresponding to the highest rate used in the transmission system.

The serial-to-parallel converter 130 puts the input digital data d(n) that appears at its input in serial form into parallel form as a set of data samples of predetermined size. These sets of data samples are identified by an index m, which corresponds to a count of sample sets obtained by serial-to-parallel conversion of a signal.

The frequency spreader device 100 applies each data sample from the converter 130, after weighting by a coefficient, to a plurality of inputs of the iFFT block 110. Each data sample is thus spread over a plurality of inputs of the iFFT block 110, and this operation corresponds to implementing the synthesis filter bank in the frequency domain.

In order to illustrate the process, consideration is given to a prototype filter comprising a number L=K*M of coefficients in the time domain. This number of coefficients in the time domain is referred to as the "length" of the prototype filter.

The total number of carrier frequencies, or subchannels, in the transmission system is written M. The factor K is an integer referred to as the overlap factor K. The serial-to-parallel converter 130 forms sets, each comprising a number of samples equal to this number M of subchannels.

The output from the iFFT block 110 is a set of K*M samples, i.e. having a number of samples equal to the product of the overlap factor K multiplied by the number of subchannels M, and referred to as the output signal from the iFFT block 110. The factor K is equal to the number of output signals from the iFFT block that present overlap in the time domain, i.e. that correspond to sets of input data samples having at least a portion in common.

Figure 2:
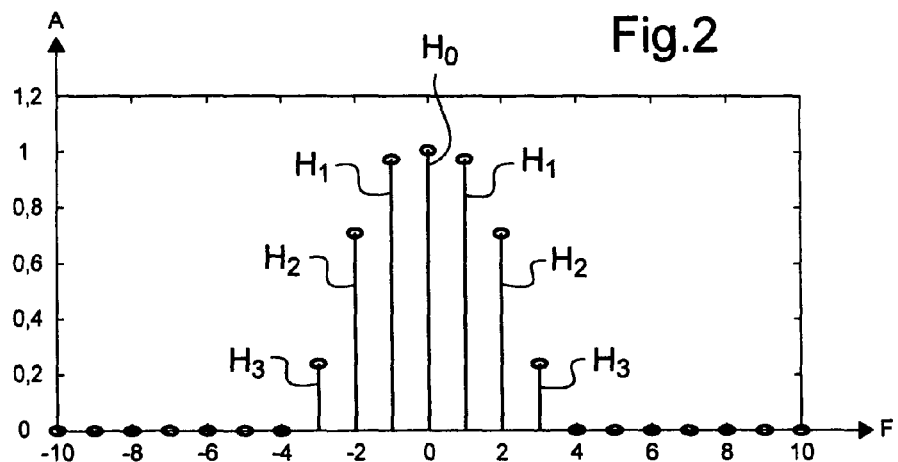
FIG. 2 shows an example of a frequency response of the prototype filter of a bank of filters.

By way of example, a frequency response of a prototype filter for an overlap factor K equal to 4 is shown in FIG. 2. This frequency response is made up of a number of non-zero values written $H_k$ that are the coefficients of the prototype filter in the frequency domain, where this number is $2*K-1$, i.e. twice said overlap factor K minus one.

In this example, these frequency coefficients are thus seven in number. FIG. 2 shows the amplitude of each frequency coefficient as a function of frequency, where the frequency unit in this example is $1/(K*T)$, T representing the duration of a set of M samples transmitted by the transmitter. A data sample is filtered by being multiplied by the non-zero frequency coefficients of the prototype filter, followed by a discrete inverse Fourier transform.

A detailed description of the method for determining the frequency coefficients of a prototype filter is given in the above-mentioned work by M. Bellanger, on pages 325 to 329.

Figure 3:
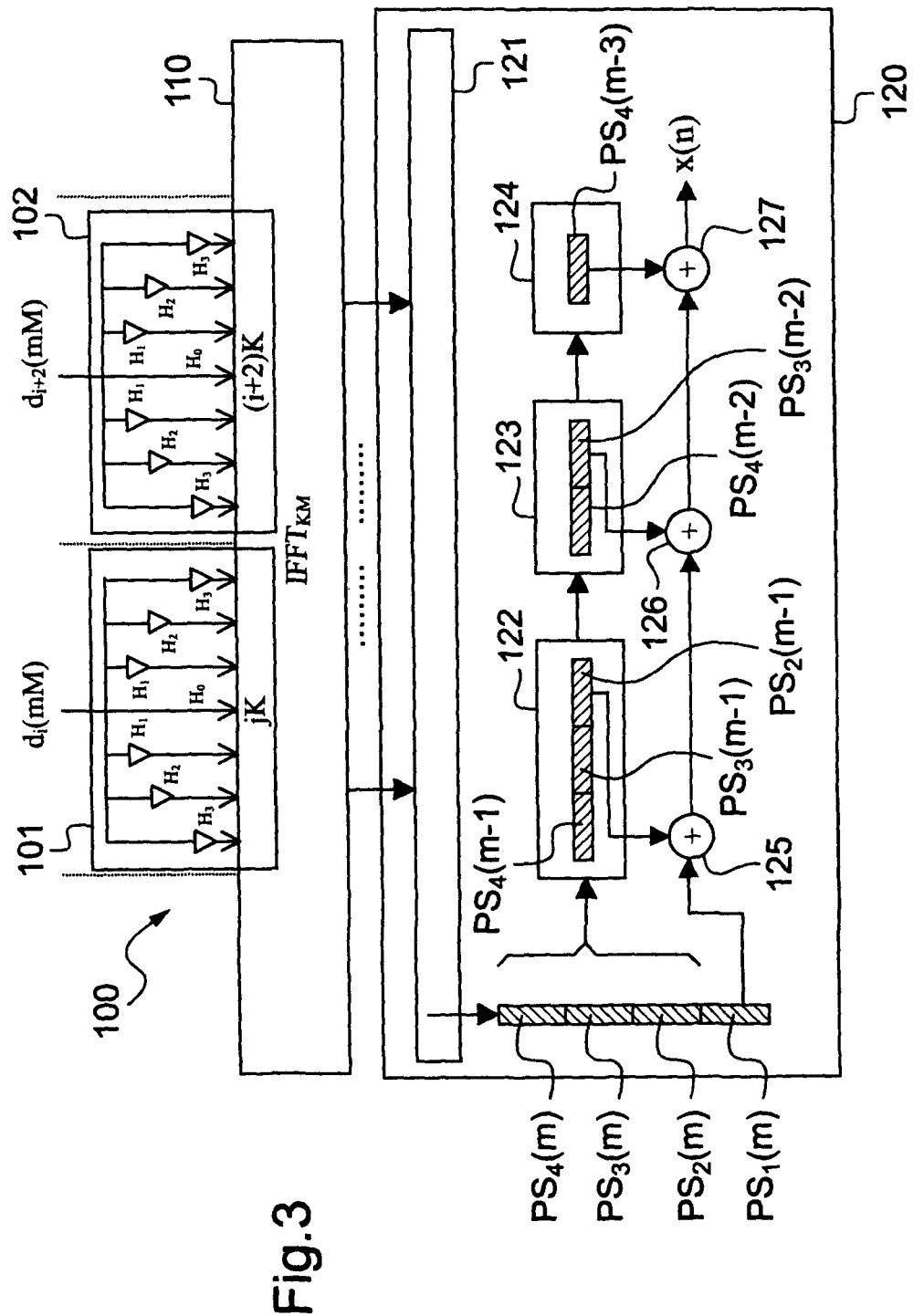
FIG. 3 is a block diagram of transmitter devices for frequency spreading, and for overlap/summing.

This process is shown in FIG. 3.

Each input data sample from the serial-to-parallel converter 130 is written $d_i(mM)$, the index m corresponding to the count of sample sets obtained by serial-to-parallel conversion of the input signal d(n). This count is also associated with the calculation rate of the iFFT block 110 of the transmitter 10, and thus the input and output signal rate of the iFFT block 110, which rate is equal to 1/M. The index i gives the subchannel index of the transmission system of the invention that is to receive this data sample.

The indices n and m satisfy the following relationship: n=m*M+p, where p has a value lying in the range 0 to M−1.

Each data sample $d_i(mM)$ is applied as input to a calculation element 101 of the frequency spreader device 100 that performs the multiplications by the $2*K-1$ frequency coefficients $H_k$. The $2*K-1$ outputs from this calculation element 101 are applied to the corresponding inputs of the iFFT block 110, having indices i*K−3, . . . , i*K+3, in this example.

Likewise, the data sample $d_{i+2}(mM)$ is applied to another calculation element 102 of the frequency spreader device 100, which performs the multiplications by the $2*K-1$ coefficients $H_k$ for the data that is for the subchannel of index i+2. The number of such calculation elements is equal to the number of subchannels used in the transmission system under consideration, and it is less than or equal to the total number of subchannels M.

It is clear that the subchannels i and i+2 do not have frequency overlap, whereas the subchannel of index i+1 possesses overlap with both of these subchannels. Under such conditions, interference is avoided by having $d_i(mM)$ and $d_{i+2}(mM)$ as real numbers and $d_{i+1}(mM)$ as an imaginary number, or vice versa. The signals with odd-numbered indices $d_{i+1}(mM)$ that are in quadrature with the real signals of even-numbered indices $d_i(mM)$ and $d_{i+2}(mM)$ are not shown in FIG. 3.

Thus, in this example, each even index i is associated with $2*K-1$ inputs of the iFFT block 110, and each odd index i is associated with $2*K-1$ inputs of the iFFT block 110 in quadrature with the inputs added with the even indices.

The size of the iFFT block 110, i.e. the number of its inputs and outputs, is equal to the length of the prototype filter of the synthesis filter bank, i.e. it is equal to K*M. In remarkable manner, the calculations are performed at the rate 1/M and not at a rate equal to the reciprocal of the size of the iFFT block 110, as is usual. Thus, in the time domain, a number equal to the factor K of successive output signals from the iFFT block 110 present time overlap, as shown in FIG. 4.

The calculation rates of the calculation elements 101, 102 of the frequency spreader device 100 and of the iFFT block 110 are synchronized by a synchronizer device (not shown).

Figure 4:
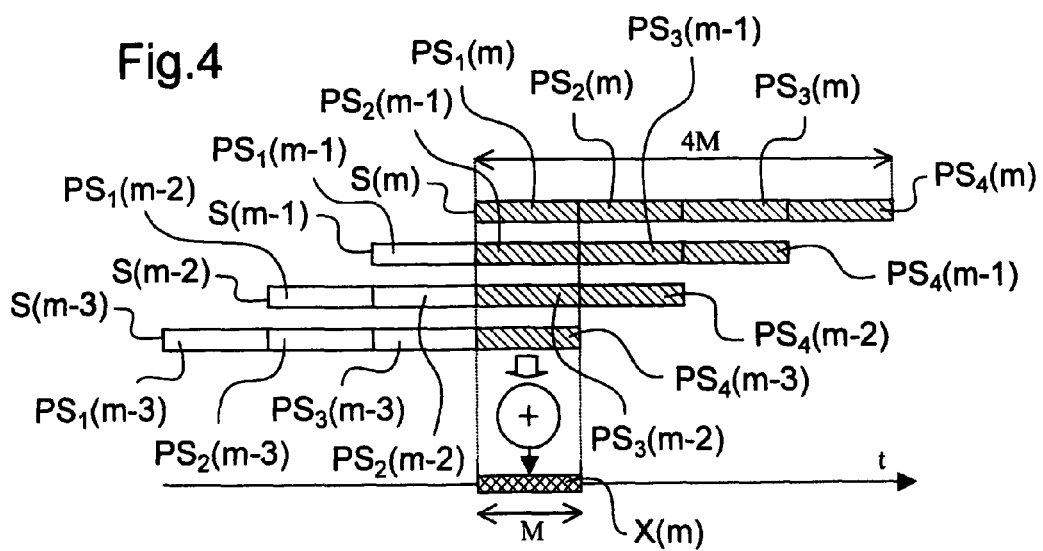
FIG. 4 is a diagram of the output signal from the parallel-to-serial converter of the overlap/sum device and it illustrates the overlap/summing operation.

Each set of M transmitted data samples is obtained by summing a portion of a plurality of signals output from the iFFT block, as shown diagrammatically in FIG. 4.

In this example, a portion of each of K successive output signals is summed, where K is the above-mentioned overlap factor. For this purpose, a portion of each of the K−1 first successive output signals from the iFFT block 110 delivered by the parallel-to-serial converter 121 of the overlap/sum device 120 is stored in one of the K−1 memories 122, 123, and 124 of the overlap/sum device 120 shown in FIG. 3.

These K−1 memories are arranged in series; the input of the first memory receives the signal from the parallel-to-serial converter, the second memory receives as input the output from the first memory, etc. Each memory has an output connected to an input of one of the K−1 adders 125, 126, and 127. A first adder 125 of the K−1 adders also receives as input the output signal from the iFFT block, and the following adders 126 and 127 also receive as input the output signal from the preceding adder.

The K−1 adders 125, 126, and 127 of the overlap/sum device 120 shown in FIG. 3 serve to add a portion of the $K^{th}$ output signal from the iFFT block 110 with the K−1 portions of the K−1 preceding output signals from the iFFT block 110 stored in the memories 122, 123, and 124, and they deliver the data samples for transmission.

A portion of each of the K−1 first output signals is stored in the K−1 memories 122, 123, and 124, there being three of them in this example.

Alternatively, only the portions of a number less than K−1 of the successive output signals from the iFFT block 110 are stored and added in order to obtain the data signal for transmission. A corresponding number of memories and adders is then provided.

FIG. 4 shows K successive output signals S(m), S(m−1), S(m−2), and S(m−3) from the iFFT block 110, associated with indices m, m−1, m−2, and m−3, prior to parallel-to-serial conversion of the signal. Each of these signals S(m), S(m−1), S(m−2), and S(m−3) has K portions $PS_u(m)$, with u varying over the range 1 to K, each having M samples.

In this example, there can thus be seen four successive output signals S(m), S(m−1), S(m−2), and S(m−3), each having four portions $PS_1(m)$, $PS_2(m)$, $PS_3(m)$, $PS_4(m)$, $PS_1(m-1)$, $PS_2(m-1)$, $PS_3(m-1)$, $PS_4(m-1)$, $PS_1(m-2)$, $PS_2(m-2)$, $PS_3(m-2)$, $PS_4(m-2)$, $PS_1(m-3)$, $PS_2(m-3)$, $PS_3(m-3)$, and $PS_4(m-3)$.

Since the rate at which these output signals S(m), S(m−1), S(m−2), and S(m−3) are produced is equal to 1/M, these signals S(m), S(m−1), S(m−2), and S(m−3) present overlaps in time.

Two consecutive output signals from the iFFT block 110, such as the output signals of indices m and m−1, i.e. S(m) and S(m−1) present time overlap corresponding to three portions of M samples each. In this example, as shown in FIG. 4 by shading, the first three portions written $PS_1(m)$, $PS_2(m)$, $PS_3(m)$ of the output signal S(m) of index m present time overlap with the last three portions $PS_2(m−1)$, $PS_3(m−1)$, and $PS_4(m−1)$ of the output signal S(m−1) of index m−1.

The signal of index m and the signal of index m−2 present time overlap of two portions of M samples each. In this example, the first two portions written $PS_1(m)$ and $PS_2(m)$ of the output signal S(m) of index m present time overlap with the last two portions $PS_3(m−2)$ and $PS_4(m−2)$ of the output signal S(m−2) of index m−2.

The signal of index m and the signal of index m−3 present time overlap of one portion comprising M samples. In this example, the first portion written $PS_1(m)$ of the output signal S(m) of index m presents time overlap with the last portion written $PS_4(m−3)$ of the output signal S(m−3) of index m−3.

Thus, the set of M samples making up the output X(m) of the transmitter 10 corresponding to the index m is obtained by summing the overlapping portions of the four successive output signals of index m to m−3 from the iFFT block 110, i.e. the first portion $PS_1(m)$ of the output signal S(m) from the iFFT block 110 having the index m, the second portion $PS_2(m−1)$ of the output signal S(m−1) from the iFFT block 110 having the index m−1, the third portion $PS_3(m−2)$ of the output signal S(m−2) from the iFFT block 110 having the index m−2, and the fourth portion $PS_4(m−3)$ of the output signal S(m−3) from the iFFT block 110 having the index m−3.

The output signal X(m+1) from the transmitter 10 having the following time index m+1 is obtained by summing the first portion of the output signal from the iFFT block 110 having the index m+1 the second portion of the output signal from the iFFT block 110 having the index m, etc.

In practice, at time m−3, the output signal S(m−3) from the iFFT block 110 having the index m−3 is applied as input to the first memory 122 of the three memories 122, 123, and 124 of the overlap/sum device 120.

This first memory 122 stores at least the last three portions, e.g. $PS_2(m−3)$, $PS_3(m−3)$, and $PS_4(m−3)$ of the output signal from the iFFT block 110 applied to its input, in this example.

At time m−2, the output signal S(m−2) from the iFFT block 110 having the index m−2 is applied as input to the first memory 122 and the second memory 123 loads at least a portion of the content of the first memory 122.

This second memory 123 stores at least the last two portions of the output signal from the first memory 122 applied to its input, e.g. $PS_3(m−3)$ and $PS_4(m−3)$, in this example.

At time m−1, the output signal S(m−1) from the iFFT block 110 having the index m−1 is applied as input to the first memory 122, the second memory 123 loads at least a portion of the content of the first memory 122, and the third memory 124 loads at least a portion of the content of the second memory 123.

This third memory 124 stores at least the last portion of the output signal from the second memory 123 that is applied to its input, e.g. $PS_4(m−3)$ in this example.

Thus, in FIG. 3, the first memory 122 contains 3*M samples, the second memory 123 contains 2*M samples, and third memory 124 contains M samples.

At time m, the output signal S(m) from the iFFT block 110 having the index m is applied as input to the first memory 122. As at each incrementation of the counter corresponding to the index m, the output signal S(m) is also applied to the input of the first adder 125 which sums the first portion $PS_1(m)$ of this signal S(m) with the first portion of the signal contained in the first memory 122. The second adder 126 sums the result of this addition and the first portion of the signal contained in the second memory 123, while the third adder 127 sums the results of this addition and the first portion of the signal contained in the third memory 124. Finally, the following are summed: the first portion $PS_1(m)$ of the signal S(m); the second portion $PS_2(m−1)$ of the signal S(m−1) from the parallel-to-serial converter at time m−1; the third portion $PS_3(m−2)$ of the signal S(m−2) from the parallel-to-serial converter at time m−2; and the fourth portion $PS_4(m−3)$ of the signal S(m−3) from the parallel-to-serial converter at time m−3.

The sum of these four portions is the signal X(m) that is transmitted by the transmitter at the time corresponding to the index m.

Alternatively, the memories of the overlap/sum device may store all of each of the signals S(m−3), S(m−2), and S(m−1) that are applied to their inputs.

Figure 5:
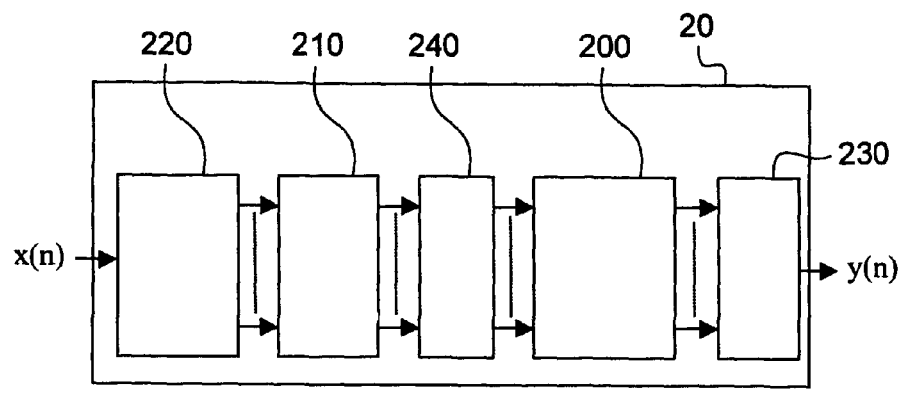
FIG. 5 is a block diagram of the receiver of a multicarrier transmission system based on filter banks and in accordance with the invention.

The block diagram of the receiver 20 is given in FIG. 5.

It comprises a serial-to-parallel converter 220, an FFT block 210 suitable for outputting the discrete Fourier transform to the signal applied to its inputs, an equalizer 240, a frequency de-spreader device 200, and a parallel-to-serial converter 230.

The FFT block 210, the equalizer 240, and the frequency de-spreader device 200 form an analysis filter bank obtained by frequency translation of the same prototype filter as is used in the analysis filter bank of the transmitter.

In this example, the received signal x(n) is assumed to be identical to the signal transmitted by the transmitter 10. This corresponds to a situation in which the transmission channel is absent. Alternatively, the received signal may differ from the signal transmitted by the transmitter 10, without that modifying the description below.

The signal x(n) received in serial form is applied to a serial-to-parallel converter 220 that forms sets of K*M data samples in parallel form, comprising a number of digital data samples that is equal to the overlap factor K multiplied by the total number M of subchannels of the transmission system. These sets of K*M samples are applied to the inputs of the FFT block 210.

In a manner similar to that described above for the transmitter 10, the index n corresponds to a time count used for the input and output signals of the receiver 20, and the index m is associated with a count of sets of samples formed by the serial-to-parallel converter 220, and with the calculation rate of the FFT block 210 of the receiver 20, and thus with the input and output signal rate of the FFT block 210, which rate is equal to 1/M, as for the transmitter 10. The index i is the index of the subchannel of the transmission system of the invention from which the data sample comes.

The FFT block 210 has the same size as the iFFT block 110, i.e. it has a number K*M of inputs and a number K*M of outputs, where said number is equal to the overlap factor K multiplied by the number M of subchannels of the transmission system.

The calculations performed by the FFT block 210 are likewise synchronized by a synchronization device that is not shown, and they are performed at the same rate as the calculations that are performed by the iFFT block 110 of the transmitter 10, i.e. a rate that is equal to the reciprocal 1/M of the number of system subchannels.

Each set of K*M samples corresponds to the time window of the Fourier transform performed by the FFT block 210, and since the Fourier transform is performed at a rate equal to 1/M, this window moves by M samples at the same rate.

The FFT block 210 is coupled to the equalizer 240, which is followed by the frequency de-spreader device 200, and then by the parallel-to-serial converter 230 that delivers the digital data stream output by the receiver 20.

Figure 6:
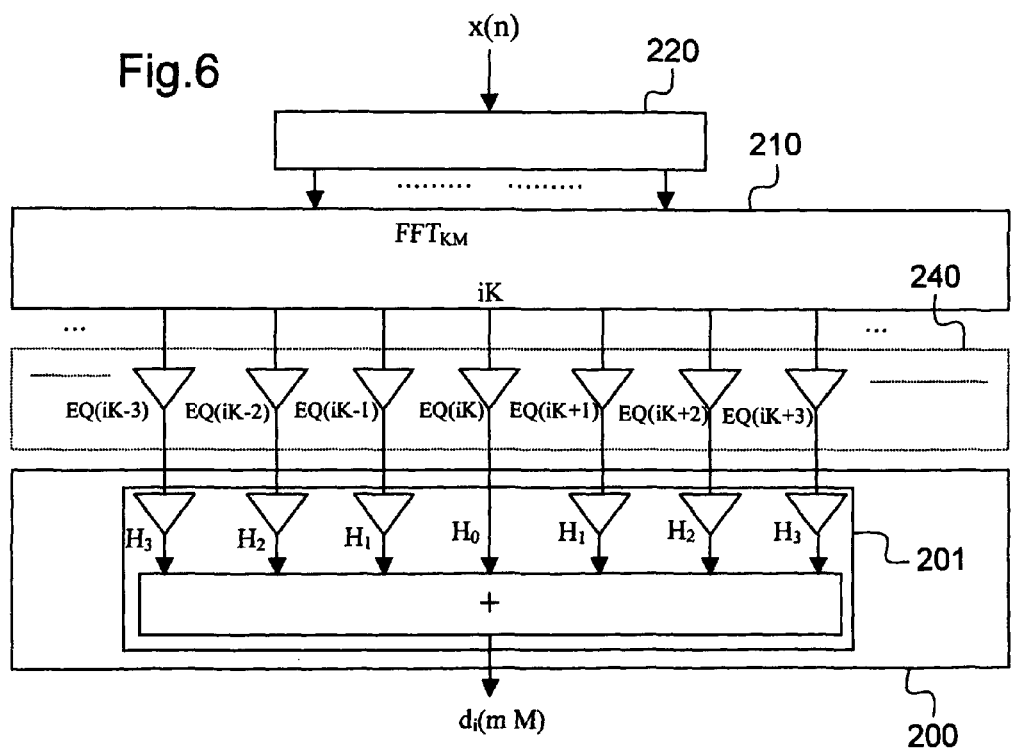
FIG. 6 is a diagram of the equalizer and the frequency de-spreader device of the FIG. 5 receiver for a subchannel of given index i.

A portion of the equalizer 240 corresponding to a particular subchannel of index i is shown in FIG. 6. The signal carried by each subchannel is present on a number 2K−1 of outputs from the FFT block 210, where said number is equal to twice the factor K minus one.

The transmission system includes means for measuring or estimating the response of the channel at the corresponding frequencies, and equalizer coefficients written EQ(iK−3), . . . , EQ(iK+3) are obtained from the results of these measurements or estimates. A description of the techniques used for measuring or estimating the channel and for calculating the coefficients for equalization is to be found in the above-mentioned article by T. Ihalainen and also in the article by M. Morelli et al. "Synchronization techniques for orthogonal frequency division multiple access: a tutorial review", Proceedings of the IEEE, Vol. 95, No. 7, July 2007, and in the article by S. Celeri et al. "A study of channel estimation in OFDM systems", IEEE Trans. on Broadcasting, Vol. 48, No. 3, September 2002.

As shown in FIG. 6, the 2K−1 signals from the outputs of the FFT block 210 associated with the subchannel of index i in the system are multiplied by the corresponding coefficients EQ(iK−3), . . . , EQ(iK+3) associated with each output of the FFT block 210 in the equalizer 240. Thereafter, the 2K−1 signals from the corresponding outputs of the equalizer are applied to a calculation element 201 of the frequency de-spreader device 200 associated with the subchannel of index i. This calculation element 201 multiplies the output signals from the equalizer by said frequency coefficients of the prototype filter.

After multiplication by the frequency coefficients $H_0$, $H_1$, $H_2$, and $H_3$ of the prototype filter, as shown in FIG. 6, the 2K−1 resulting corresponding signals are added together by the calculation element 201 so as to deliver the output signal $d_i(mM)$ from which the data sequence is restored. At time n, the data sequence y(n) output by the receiver 20 is restored from the output signals $d_i(mM)$ from all of the subchannels of index i.

The invention also provides a data transmission method for data transmitted and/or received by a transmitter and/or receiver as described above, in which each subchannel is modulated by modulation of the offset quadrature amplitude modulation (OQAM) type. The principle of such modulation and how it can be implemented are described in the above-mentioned article by P. Siohan et al., and also in the article by B. Hirosaki "An orthogonally multiplexed QAM system using the discrete Fourier transform", IEEE Trans. on Communications, Vol. 29, No. 7, July 1981.

In the method in accordance with the invention, the calculation rate imposed at the transmitter and/or the receiver of the invention is 2/M instead of the above-considered rate of 1/M, while applying the data for transmission in alternation to the real inputs and to the imaginary inputs of each subchannel.

The implementation of the transmission system of the invention is not modified. A signal is transmitted and received by repeating the operations explained above with reference to FIG. 1 on transmission and the operations explained above with reference to FIG. 5 on reception, but at the rate 2/M.

Various modifications of the present invention may appear to the person skilled in the art in the light of the present description and the accompanying diagram.

In particular, it is possible to envisage that the transmission system of the invention has only one transmitter or one receiver as described above, which one transmitter or receiver is used respectively with a receiver or a transmitter known to the person skilled in the art.

The invention claimed is:

1. A multicarrier transmission system for transmitting a signal comprising digital data over a predetermined number of subchannels, the system comprising:
at least a transmitter having a synthesis filter bank deduced from a prototype filter by frequency translation,
the transmitter including a serial-to-parallel converter that forms sets of samples of the signal for transmission, each set comprising a number of samples equal to the number of subchannels of said system, and an iFFT block adapted to output the inverse Fourier transform of said signal applied to its inputs,
said transmitter also including a frequency spreader device that performs a plurality of multiplications of at least a given data sample output from the serial-to-parallel converter by respective predetermined frequency coefficients of the prototype filter of the synthesis filter bank, and respectively applies signals resulting from said multiplications of said given data sample to respective inputs among said inputs of the iFFT block, which block presents a size, representing a number of said inputs of the iFFT block equal to a number of outputs of the iFFT block, that is strictly greater than said predetermined number of subchannels.

2. A multicarrier transmission system according to claim 1, wherein the transmitter also includes an overlap/sum device comprising a parallel-to-serial converter that receives as inputs the signals from the outputs of the iFFT block and that delivers as output an output signal corresponding to the time succession of successive output signals from the iFFT block, the overlap/sum device also adding a portion of the output signal from the serial-to-parallel converter to a portion of one or more preceding output signals from the iFFT block, in order to deliver the signal that is transmitted by said transmitter.

3. A multicarrier transmission system according to claim 2, wherein said size of the iFFT block of the transmitter is equal to the length of the prototype filter of the synthesis filter bank, said length being a multiple by an integer factor K of the total number of subchannels M.

4. A multicarrier transmission system according to claim 3, wherein a number of signals transmitted by the same number of adjacent outputs of the iFFT block present time overlap corresponding to M data samples, where said number is equal to said factor K, and said overlap/sum device sums the overlapping portions of each of these K signals transmitted by K adjacent outputs of the iFFT block to deliver at least a portion of the signal transmitted by said transmitter.

5. A multicarrier transmission system for transmitting digital data over a predetermined number of subchannels, the system including at least one receiver having an analysis filter bank deduced from a prototype filter by frequency translation, the receiver having a serial-to-parallel converter that forms sets of samples of the received signal, each set comprising a number of samples equal to said predetermined number of subchannels of the system, and an FFT block adapted to deliver at its output the Fourier transform of the signal applied to its input, the system being characterized in that said FFT block of said receiver presents a size, representing a number of inputs equal to the number of its outputs, that is strictly greater than said predetermined number of subchannels of the system, and in that said receiver further includes a frequency de-spreader device that multiplies the signal from each output of the FFT block by one of the predetermined frequency coefficients of the prototype filter of the analysis filter bank, and sums the results of these multiplications in order to deliver at least a portion of the output signal from said receiver.

6. A multicarrier transmission system according to claim 5, wherein said receiver also includes a synchronizer device imposing a calculation rate on the FFT block that is strictly greater than the rate equal to the reciprocal of the size of said FFT block.

7. A multicarrier transmission system according to claim 5, wherein the size of the FFT block of the receiver is equal to the length of the prototype filter of the filter bank, said length being a multiple by an integer factor K of the total number of subchannels M, and wherein two consecutive input signals of the FFT block present time overlap by a number of received signal samples equal to the size of the FFT block from which the total number of the subchannels M has been subtracted.

8. A multicarrier transmission system according to claim 5, wherein the receiver includes an equalizer inserted between the FFT block (210) and the frequency de-spreader device, which equalizer multiplies the signal from each output of the FFT block by a predetermined equalizer coefficient.

9. A multicarrier transmission method for transmitting a signal using the multicarrier transmission system according to claim 1, wherein the signals of the subchannels are modulated using OQAM.

10. A multicarrier transmission system for transmitting digital data, the system being based on filter banks, and comprising a transmitter according to claim 1 and a receiver having an analysis filter bank deduced from a prototype filter by frequency translation, the receiver having a serial-to-parallel converter that forms sets of samples of the received signal, each set comprising a number of samples equal to said predetermined number of subchannels of the system, and an FFT block adapted to deliver at its output the Fourier transform of the signal applied to its input, the system being characterized in that said FFT block of said receiver presents a size, representing a number of inputs equal to the number of its outputs, that is strictly greater than said predetermined number of subchannels of the system, and in that said receiver further includes a frequency de-spreader device that multiplies the signal from each output of the FFT block by one of the predetermined frequency coefficients of the prototype filter of the analysis filter bank, and sums the results of these multiplications in order to deliver at least a portion of the output signal from said receiver.

11. A multicarrier transmission method for transmitting a signal using a multicarrier transmission system according to claim 10, wherein the signals of the subchannels are modulated by OQAM.

12. A multicarrier transmission method for transmitting a signal using the multicarrier transmission system according to claim 5, wherein the signals of the subchannels are modulated using OQAM.

13. A multicarrier transmission system according to claim 10, wherein said receiver also includes a synchronizer device imposing a calculation rate on the FFT block that is strictly greater than the rate equal to the reciprocal of the size of said FFT block.

14. A multicarrier transmission system according to claim 10, wherein the size of the FFT block of the receiver is equal to the length of the prototype filter of the filter bank, said length being a multiple by an integer factor K of the total number of subchannels M, and wherein two consecutive input signals of the FFT block present time overlap by a number of received signal samples equal to the size of the FFT block from which the total number of the subchannels M has been subtracted.

15. A multicarrier transmission system according to claim 10, wherein the receiver includes an equalizer inserted between the FFT block and the frequency de-spreader device, which equalizer multiplies the signal from each output of the FFT block by a predetermined equalizer coefficient.

* * * * *